(No Model.)

H. G. FITLER & W. H. ARMSTRONG.
NUT LOCK.

No. 447,509. Patented Mar. 3, 1891.

WITNESSES:
P. H. Aagle
F. Norman Dixon

INVENTORS
Harry G. Fitler
Wm. H. Armstrong
BY Shawbridge & Taylor
ATTORNEYS

UNITED STATES PATENT OFFICE.

HARRY G. FITLER AND WILLIAM H. ARMSTRONG, OF PHILADELPHIA, PENNSYLVANIA, ASSIGNORS OF TWO-FIFTHS TO JAMES HENRY F. DIXON, OF SAME PLACE.

NUT-LOCK.

SPECIFICATION forming part of Letters Patent No. 447,509, dated March 3, 1891.

Application filed November 5, 1889. Serial No. 329,288. (No model.)

*To all whom it may concern:*

Be it known that we, HARRY G. FITLER and WILLIAM H. ARMSTRONG, both citizens of the United States, and both residents of Philadelphia, in the county of Philadelphia, in the State of Pennsylvania, have jointly invented certain new and useful Improvements in Nut Locks, of which the following is a specification.

Our improvements, although of utility when embodied in nut locks employed in sundry applications in the arts, relate especially to the nut locks which are employed in connection with the fish bolts of railroad rails.

It is the object of our invention to provide a nut lock or fastener which shall not only adjust itself to the expansion and contraction of the fish bolt, but also lock the nut applied to the bolt in such manner that said nut is, while firmly held against undue rotation or working loose, at the same time capable of rotation upon the application of the customary tool.

In the accompanying drawings we illustrate and herein we describe a good form of a convenient embodiment of our invention, the particular subject matter claimed as novel being hereinafter definitely specified.

Figure 1:
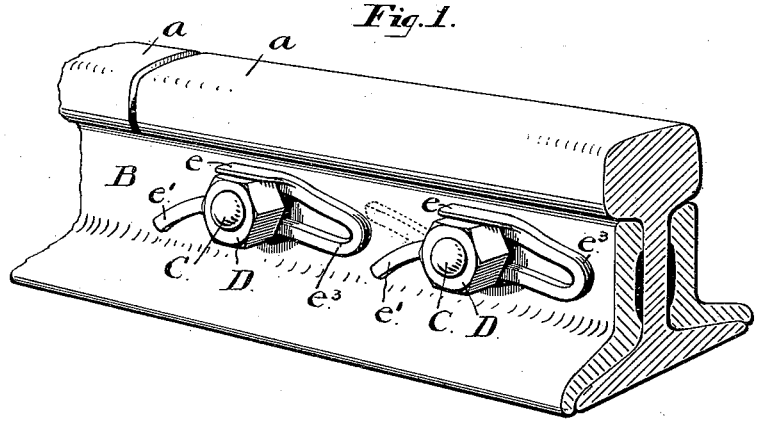
Figure 2:
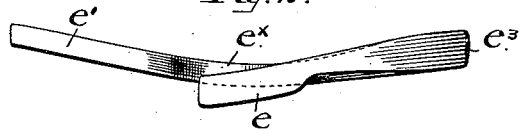
Figure 3:
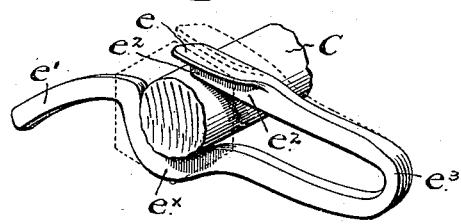
Figure 4:
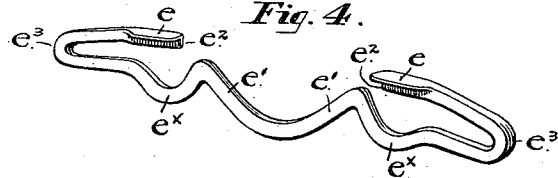

In the drawings, Figure 1 is a perspective view of the meeting ends of two rails, provided with angle bars and fish bolts, having hexagonal nuts, and illustrating the application of our improved nut fastener. Fig. 2 is an edge view of the nut fastener removed from its bolt. Fig. 3 is a perspective view of a portion of a bolt with the nut fastener in place thereon, illustrating in full lines the normal position of the locking end, and in dotted lines the sprung position which said end assumes when it is forced outward by the corner of a nut. Fig. 4 is a perspective view of a fastener embodying our invention, and arranged to lock two adjacent nuts Similar letters of reference indicate corresponding parts.

In the drawings, A are the rails, B are the angle bars, C the fish bolts, and D the nuts. The nuts shown are of the hexagonal variety.

The fastener when applied exists between the fish plate or angle bar, and the nut, and the type of nut fastener to which this invention appertains has portions of its body sprung oppositely outward to bear against the fish plate and the nut respectively.

The fastener is formed conveniently of a four-sided bar of steel, and its profile configuration as shown in the first three figures of the drawings, may be generally described as consisting of an eye and two wings. The metal of the bar is conformed to this shape by being, at a point somewhat to the left (Fig. 3) of its longitudinal center bent downward to form a semicircular or open eye $e^x$ of a radius about corresponding to that of the circumference of the bolt. The metal at the left side of said eye extends up conveniently to about the level of the upper side of the bolt, and the remainder of the left hand portion of the bar beyond said eye extends away from said eye to form the smaller wing, $e'$, of the device. The metal of said smaller wing may, as shown in full lines in the drawings, gradually extend downward and terminate at a point about level with the lower portion of the eye, or may, as shown in dotted lines in Fig. 1 of the drawings, gradually extend upward, in which latter case it will, as shown, lie between the head or top of the rail and the larger wing of the adjacent fastener,—with the result that neighboring fasteners will thus be interlocked. The metal of the right side of the eye extends up the side of the bolt a short distance, and the remainder of the right hand portion of the bar beyond said eye extends away from the eye a suitable distance, bends upward, and returns so that its end, $e^2$, is close to the nut and bolt, and preferably lies beneath the nut,—the whole forming the larger wing, $e^3$, of the nut lock.

The body of the fastener is, to constitute it a spring "oppositely bent" as we term it, so as to be capable of compression in the direction of the length of the bolt in connection with which it is employed, the outer portions of the wings being both bent rearwardly or so as to bear against the fish plate, and portions of the fastener lying between said ends being bellied outwardly so as to bear against the nut.

Our nut fastener is, preferably at a portion of its length which is curved outwardly or away from the fish plate to bear against the under face of the nut, provided with a flange $e$ which projects outward or in parallelism with the bolt, and which flange may either be, as is preferable, formed integral with the metal of the fastener, or be formed separately therefrom and secured thereto. This flange, which is designed to bear against the side face of a nut and bind or clamp said nut against rotation, we prefer to form upon the outer edge of the end $e^2$, so that at the same time that the flange bears against the side face, said end $e^2$ bears against the under face, of the nut. The flange is as to its inner face flat so as to rest accurately against a side face of the nut, and is preferably somewhat longer than one of said side faces, so that its end will clear or avoid encounter by the corner of the nut when the latter is rotated. The basal portion of the flange, being merged into, or secured all along its length to, the body of the fastener, is thus at all points of its contact with the side of the nut directly supported or reenforced by the metal of said fastener.

The nut in its application as it travels up the bolt encounters the eye of the fastener, and the end $e^2$ of the wing $e^3$, and tends to compress or flatten the whole, and the strength of the resistance which said fastener opposes to said compression is governed by the depth or thickness of said fastener from front to back.

The nut when screwed upon the bolt passes beneath the flange, that is between it and the bolt, and the corners of the nut, in its rotation, encounter said flange, and spring it and the end $e^2$ of which it is a part, outwardly or radially away from the nut, thus spreading the fastener, and, after the passage of each corner thereunder, said end springs back to its normal set, and causes the flat face of the flange to bear against the succeeding side face of said nut. The resistance which said arm and flange oppose to the spreading action of the nut and consequently the force with which they return to their normal position, is governed by the lateral thickness (as opposed to the depth) of the metal of the wing, particularly at the outer bend thereof, as well as by the length of said wing. It is apparent, therefore, that the strength of the resistance to the spreading action of the nut, and the strength of the resistance to the compressing action of the nut in the direction of the length of the bolt, may be regulated independently of each other.

The flange, which preferably extends, as stated, along an entire face of the nut or further, and is re-enforced or supported all along its base by its union with the body of the metal of the fastener,—is positive in its clasp or hold upon the nut, its pressure, equally distributed along an entire face thereof, being much more effectual, as is obvious, in opposing motion on the part of the nut than if said pressure were concentrated at one given point intermediate of the length of one of said side faces. The pressure however necessary under this arrangement to hold the nut against loosening under the hammering of the rails by passing trains, and other influences, is not so great as to present any inconvenience in the manipulation of said nut with the customary tools to tighten or loosen it. Upon grasping the nut with a tool and rotating it, the corners of said nut, as stated, spring the flange radially outward, said corners sliding along said flange, which acts as an inclined plane.

The wings of the device are of such length that they are by the head or crown and the foot of the rail, or by interlocking, confined against rotation.

By the provision in connection with an oppositely bent nut lock, of a flange or equivalent device adapted to be presented against the side of a nut, mounted upon a part of said nut lock which is normally sprung outward away from the fish plate, said flange will be in position to bear against the side of the nut in all the various stages of compression to which the nut lock may be subjected.

In Fig. 4 we show a double nut lock embodying our improvements, which nut lock resembles two single nut locks joined together at the extremities of their smaller wings. The parts of said double nut lock are designated by the same letters as are applied to the corresponding parts of the single nut locks.

Having thus described our invention, we claim—

1. In combination with a fish plate, a bolt, and a many sided nut, a fish bolt nut lock mounted upon the bolt between the nut and plate, said nut lock embodying a free portion or end capable of radial movement with respect to the bolt and nut, upon which end or portion is mounted a flange which normally sets against a side face of the nut, but which flange in the manipulation of the nut is transiently lifted by the contact of a corner thereof in passing beneath it,—said nut lock being formed as a spring so as to bear respectively against and tend to force apart the fish plate and nut and so as to present said flange against the side of the nut in the different positions of the latter upon the bolt, substantially as set forth.

2. In combination with a fish plate, a bolt, and a many sided nut, a fish bolt nut lock, consisting of a bar of metal formed intermediately of its length into an open eye through which the bolt extends, one end portion of said bar extending away from the eye and then returning so that its extremity lies within the opening of said eye and beneath the nut, said returning extremity being set out from the fish plate to press said nut away from the fish plate, and a flange extending along the side of the portion of the bar extremity which is beneath the nut, which flange
5 normally sets against and along the side of the nut, substantially as set forth.

In testimony that we claim the foregoing as our invention we have hereunto signed our names this 22d day of October, A. D. 1889.

HARRY G. FITLER.
    WILLIAM H. ARMSTRONG.

In presence of—
    NEWITT J. NEALL,
    JAS. F. NEALL.